United States Patent
Li et al.

(10) Patent No.: US 12,300,814 B2
(45) Date of Patent: May 13, 2025

(54) LITHIUM ION SECONDARY BATTERY

(71) Applicant: CONTEMPORARY AMPEREX TECHNOLOGY (HONG KONG) LIMITED, Hong Kong (CN)

(72) Inventors: Zhiqiang Li, Ningde (CN); Changlong Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/383,050

(22) Filed: Oct. 24, 2023

(65) Prior Publication Data

US 2024/0063379 A1 Feb. 22, 2024

Related U.S. Application Data

(63) Continuation of application No. 16/768,753, filed as application No. PCT/CN2019/105138 on Sep. 10, 2019, now abandoned.

(30) Foreign Application Priority Data

Sep. 19, 2018 (CN) .......................... 201811094862.X

(51) Int. Cl.
| | |
|---|---|
| H01M 4/505 | (2010.01) |
| C01G 53/50 | (2025.01) |
| H01M 4/525 | (2010.01) |
| H01M 10/0525 | (2010.01) |
| H01M 10/0567 | (2010.01) |
| H01M 10/0568 | (2010.01) |
| H01M 10/0569 | (2010.01) |
| H01M 4/02 | (2006.01) |

(52) U.S. Cl.
CPC ............ *H01M 4/505* (2013.01); *C01G 53/50* (2013.01); *H01M 4/525* (2013.01); *H01M 10/0525* (2013.01); *H01M 10/0567* (2013.01); *H01M 10/0568* (2013.01); *H01M 10/0569* (2013.01); *C01P 2006/40* (2013.01); *H01M 2004/021* (2013.01); *H01M 2004/028* (2013.01); *H01M 2300/0037* (2013.01)

(58) Field of Classification Search
None
See application file for complete search history.

(56) References Cited

U.S. PATENT DOCUMENTS

| | | | | |
|---|---|---|---|---|
| 9,666,862 B2 * | 5/2017 | Chang | ................... | H01M 4/525 |
| 2019/0355969 A1 * | 11/2019 | Muroya | ................ | H01M 10/05 |

OTHER PUBLICATIONS

J.B. Dunn, L. Gaines, M. Barnes, J. Sullivan, M. Wang. Materials and Energy Flows in the Materials Production, Assembly, and End-of-Life Stages of the Automotive Lithium-ion Battery Life Cycle, Argonne National Laboratory, Energy Systems Division, Jun. 2012.*

J. Wang, Y. Yu, B. Li, P. Zhang, J. Huang, F. Wang, S. Zhao, C. Gan, J, Zhao. Thermal Synergy Effect between LiNi0.5Co0.2Mn0.3O2 and LiMn2O4 Enhances the Safety of Blended Cathode for Lithium Ion Batteries, ACS Appl. Mater. Interfaces 2016, 8, 20147-20156.*

J. Xia, C. P. Aiken, L. Ma, G. Y. Kim, J. C. Burns, L. P. Chen, J. R. Dahn, Combinations of Ethylene Sulfite (ES) and Vinylene Carbonate (VC) as Electrolyte Additives in Li(Ni1/3Mn1/3C01/3)02/Graphite Pouch Cells, Journal of The Electrochemical Society, 161 (6) A1149-A1157 (2014).*

* cited by examiner

*Primary Examiner* — Carlos Barcena
(74) *Attorney, Agent, or Firm* — K&L Gates LLP

(57) ABSTRACT

This application relates to a lithium ion secondary battery comprising a battery core and an electrolyte, wherein the battery core comprises a lithium-manganese-based positive electrode active material; the electrolyte comprises a solvent, a lithium salt and an additive comprising vinylene carbonate; and wherein the weight percentage q of the electrolyte based on the total weight of the positive electrode active material layer in the battery core, the weight percentage r of vinylene carbonate present in the electrolyte, the compaction density s of the negative electrode active material layer in the battery core and the weight percentage p of manganese element present in the positive electrode active material satisfies $0.05 \leq q \cdot r \cdot s/p \leq 6$, wherein the units of q, r, and p are wt %, and the unit of s is $g/cm^3$. The lithium ion secondary battery in this application has relatively high safety performance, cycle performance and storage performance.

19 Claims, No Drawings

LITHIUM ION SECONDARY BATTERY

CROSS-REFERENCE TO RELATED APPLICATION

This application is a continuation of U.S. patent application Ser. No. 16/768,753, filed on Jun. 1, 2020, which is a National Stage of International Application No. PCT/CN2019/105138, filed on Sep. 10, 2019, which claims priority to Chinese Patent Application No. 201811094862.X filed on Sep. 19, 2018. The aforementioned patent applications are incorporated herein by reference in their entireties.

TECHNICAL FIELD

This application belongs the technical field of batteries, and particularly relates to a lithium ion secondary battery.

BACKGROUND

Lithium ion secondary batteries can provide stable voltage and current, have a high-voltage platform, high energy density, and a wide temperature range without memory effect, and are environment-friendly and easy to carry. They have become the mainstream source of power for various consumer electronics, electric vehicles, and mechanical equipments.

With the increasing application of lithium ion secondary batteries, higher requirements for the safety performance of lithium ion secondary batteries are raised. Therefore, how to further improve the safety performance of lithium ion secondary batteries has become an important technical issue in the research and development of batteries.

SUMMARY

The positive electrode active material has an important influence on the safety performance of a lithium ion secondary battery. The inventors have found that the safety performance of a lithium ion secondary battery can be improved by using a positive electrode active material containing a manganese element. However, since the manganese in the positive electrode easily undergoes a disproportionation reaction, the generated $Mn^{2+}$ dissolves in electrolyte and migrates to the interface of the negative electrode, then undergoes an ion exchange with lithium in the negative electrode, occupies the position for lithium intercalation in the negative electrode and is not easy to be released from such position, thereby resulting in a decreased lithium storage capacity of the negative electrode. In addition, the lithium ions released by ion exchange can no longer participate in the de-intercalation between the positive electrode and the negative electrode, causing a capacity loss of the battery. This causes the deterioration in both cycle performance and storage performance of lithium ion secondary batteries, and even worse at a high temperature (above 40° C.).

The inventors have carried out a lot of research, aiming to improve the adverse effects of the manganese-containing positive electrode active material on the negative electrode in a lithium ion secondary battery, and improving the stability of the negative electrode, thereby providing a lithium ion secondary battery with high safety performance and cycle performance and storage performance.

Therefore, an embodiment of the present application provides a lithium ion secondary battery comprising a battery core and an electrolyte, wherein the battery core comprises a positive electrode active material that is based on lithium and manganese (also referred to as "lithium-manganese-based positive electrode active material" hereafter), and the electrolyte comprises a solvent, a lithium salt and an additive, and the additive comprises vinylene carbonate;

wherein the weight percentage q of the electrolyte based on the total weight of the layer of the positive electrode active material in the battery core, the weight percentage r of vinylene carbonate present in the electrolyte, the compaction density s of the layer of the negative electrode active material in the battery core and the weight percentage p of manganese element present in the positive electrode active material satisfies the formula (1):

$$0.05 \leq \frac{q \cdot r \cdot s}{p} \leq 6 \qquad \text{Formula (1)}$$

in the formula (1), the units of q, r, and p are wt %, and the unit of s is $g/cm^3$.

In the lithium ion secondary battery provided in the embodiment of the present application, the positive electrode active material comprises a lithium-manganese-based positive electrode active material. Such positive electrode active material has better structural stability, can withstand relatively severe structural destructive force, and reduces thermal runaway caused by structural destruction of the material. In addition, the electrolyte on the surface of the positive electrode active material has a lower oxidation effect, which can reduce side reactions of the electrolyte on the surface of the positive electrode active material, thereby suppressing gas generation and reducing heat generation. As a result, the safety performance of the lithium ion secondary battery is effectively improved.

A dense interface film with more optimized structure and composition at the interface of the negative electrode can be generated by using a lithium ion secondary battery comprising a battery core and an electrolyte satisfying the relationship formula (1), meanwhile the electrolyte comprising an additive vinylene carbonate. This interface film can effectively protect the negative electrode, and significantly reduce the ion exchange between $Mn^{2+}$ and lithium in the negative electrode, thereby suppressing the destruction of the negative electrode caused by manganese and improving the stability of the negative electrode. In addition, the lithium ion secondary battery can also have a lower interfacial resistance of the negative electrode and a suitable viscosity of the electrolyte. Thus, the capacity retention ratio of the lithium ion secondary battery during cycling and storage is improved, so that the lithium ion secondary battery has relatively high cycle performance and storage performance, and the battery can also have relatively high safety performance and cycle performance and storage performance at high temperature.

DETAILED DESCRIPTION

In order to make the objects, the technical solutions and the beneficial technical effects of this application more clear, this application will be described in further details below with reference to the embodiments. However, it is to be understood that the embodiments of this application are provided only for the purpose of illustrating the invention, and are not intended to limit the scope of the invention.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description of the present application, it is to be noted that unless otherwise stated, the words "above" and "below" are inclusive of the case where it is equal to, and the word "more" in fragment "one or more" means two or more.

The above contents of the application are not intended to describe each and every example or embodiment disclosed herein. More exemplary embodiments will be described below in more details by way of examples. At a plurality of places throughout the present application, a series of examples are provided to give teachings, and these examples can be combined in any way, if possible. In each example, the exemplification is just for illustrative purpose, and shall not be interpreted as enumeration.

An embodiment of the present application provides a lithium ion secondary battery comprising a battery core and an electrolyte.

The battery core comprises one or more positive electrode plates, one or more negative electrode plates, and a separate between the positive electrode plates and the negative electrode plates.

The positive electrode plate comprises a positive electrode current collector and a layer of positive electrode active material disposed on at least one surface of the positive electrode current collector. As an example, the positive electrode current collector has two surfaces opposite in the thickness direction of the positive electrode current collector, and the positive electrode active material layer is laminated on one or both of the two surfaces of the positive electrode current collector.

The layer of the positive electrode active material (also referred to as the "positive electrode active material layer" herein) contains a positive electrode active material, which can carry out reversible de-intercalation/intercalation of lithium ions during operation. The positive electrode current collector collects and conducts current.

The negative electrode plate comprises a negative electrode current collector and a layer of negative electrode active material disposed on at least one surface of the negative electrode current collector. As an example, the negative electrode current collector has two surfaces opposite in the thickness direction of the negative electrode current collector, and the layer of negative electrode active material is laminated on one or both of the two surfaces of the negative electrode current collector.

The layer of negative electrode active material (also referred to as the "negative electrode active material layer" herein) contains a negative electrode active material, which can carry out reversible de-intercalation/intercalation of lithium ions during operation. The negative electrode current collector collects and conducts current.

The electrolyte comprises a solvent, a lithium salt and an additive. The solvent transports lithium ions between the positive and negative electrodes in battery.

The positive electrode plate, the separator and the negative electrode plate are alternately stacked, so that the separator is placed between the positive electrode plate and the negative electrode plate to take a function of isolating the positive electrode plate and the negative electrode plate, thereby obtaining a battery core. A battery core may also be obtained by means of winding. The battery core is placed in a package; after injection of an electrolyte, the electrolyte sufficiently wets in the pores of the positive electrode active material layer, the negative electrode active material layer and the separator, and then the package is sealed to give a lithium ion secondary battery.

Further, the positive electrode active material is a lithium-manganese-based positive electrode active material; the additives in the electrolyte comprises vinylene carbonate (VC); and the battery core and the electrolyte satisfy the formula (1):

$$0.05 \le \frac{q \cdot r \cdot s}{p} \le 6 \qquad \text{Formula (1)}$$

in formula (1), q represents the weight percentage of the electrolyte based on the total weight of the positive electrode active material layer in the battery core, expressed in wt %; r represents the weight percentage of vinylene carbonate present in the electrolyte, expressed in wt %; s represents the compaction density of the negative electrode active material layer in the battery core, expressed in g/cm$^3$; and p represents the weight percentage of manganese element present in the positive electrode active material, expressed in wt %.

The total weight of the positive electrode active material layer in the battery core relates to the sum of the weights of all the layers of the positive electrode active materials in the positive electrodes in the battery core.

In the present application, the calculation of formula (1) only involves the calculation of numerical values. For example, in case that the weight percentage q of the electrolyte based on the total weight of the positive electrode active material layer in the battery core is 51 wt %, the weight percentage r of vinylene carbonate present in the electrolyte is 2.2 wt %, the compaction density s of the negative electrode active material layer in the battery core is 1.6 g/cm$^3$, and the weight percentage p of manganese element present in the positive electrode active material is 30 wt %, then $$\frac{q \cdot r \cdot s}{p} = \frac{51 \times 2.2 \times 1.6}{30} = 5.984.$$

In the lithium ion secondary battery of embodiments of the present application, the positive electrode active material comprises lithium-manganese-based positive electrode active material. Lithium-manganese-based positive electrode active material has better structural stability, can withstand relatively severe structural destructive force, and reduces thermal runaway caused by structural destruction of the material. In addition, the electrolyte on the surface of the lithium-manganese-based positive electrode active material has a lower oxidation effect, which can reduce side reactions of the electrolyte on the surface of the positive electrode active material, thereby suppressing gas generation and reducing heat generation. As a result, the safety performance of the lithium ion secondary battery is effectively improved. A dense interface film with more optimized structure and composition at the interface of the negative electrode can be generated by using a lithium ion secondary battery comprising a battery core and an electrolyte satisfying the relationship formula (1), meanwhile the electrolyte comprising an additive vinylene carbonate. This interface film can effectively protect the negative electrode, and significantly reduce the ion exchange between $Mn^{2+}$ and lithium in the negative electrode, thereby suppressing the destruction of the negative electrode caused by manganese and improving the stability of the negative electrode. In addition, the relationship formula (1) satisfied by a battery core and an electrolyte also ensures that the lithium ion secondary battery has a lower interfacial resistance of the negative electrode and a suitable viscosity of the electrolyte. Thus, the lithium ion secondary battery of the present application not only has relatively high capacity and kinetic performance, but also has the improved capacity retention ratio during cycling and storage, so that the lithium ion secondary battery has relatively high cycle performance and storage performance.

Thus, the lithium ion secondary battery of embodiments of the present application can have relatively high safety performance and cycle performance and storage performance at the same time, and the battery can also have relatively high safety performance and cycle performance and storage performance at high temperature.

Preferably, the weight percentage q of the electrolyte based on the total weight of the positive electrode active material layer in the battery core, the weight percentage r of vinylene carbonate present in the electrolyte, the compaction density s of the negative electrode active material layer in the battery core and the weight percentage p of manganese element present in the positive electrode active material satisfies the formula (2):

$$0.25 \leq \frac{q \cdot r \cdot s}{p} \leq 5 \qquad \text{Formula (2)}$$

in the formula (2), the units of q, r, and p are wt %, and the unit of s is $g/cm^3$.

In the lithium ion secondary battery in embodiments of the present application, the weight percentage q of the electrolyte based on the total weight of the positive electrode active material layer in the battery core is preferably from 20 wt % to 70 wt %. On the one hand, this makes the battery cells fully wetted by the electrolyte and ensures an effective exertion of the capacity of the battery and improves the capacity and capacity retention ratio of the battery; on the other hand, this also facilitates the improvement of safety performance of the battery.

In the lithium ion secondary battery in embodiments of the present application, the ratio of the number of vinylene carbonate molecules to the number of manganese atoms is preferably from 0.1:100 to 1.3:100. This can further reduce the ion exchange between $Mn^{2+}$ and lithium in the negative electrode, improve the cycle performance and storage performance of the battery, and facilitate higher capacity of the battery.

In the lithium ion secondary battery in embodiments of the present application, the weight percentage p of manganese element present in the positive electrode active material layer is preferably from 5 wt % to 50 wt %. A suitable weight percentage p of manganese element present in the positive electrode active material layer can result in a battery having relatively high safety performance, higher capacity and high-temperature storage performance at the same time.

More preferably, the weight percentage p of manganese element present in the positive electrode active material is from 6 wt % to 35 wt %.

The positive electrode active material layer preferably has a compaction density of from 3.0 $g/cm^3$ to 3.6 $g/cm^3$. A suitable compaction density of the positive electrode active material layer can lead to a relatively low porosity within the positive electrode active material layer under the condition that the thickness of the positive electrode plate is constant. This is favorable for reducing the dissolution rate of Mn from the positive electrode active material, thereby improving cycle performance and storage performance of the battery. The positive electrode active material layer having compaction density of from 3.0 $g/cm^3$ to 3.6 $g/cm^3$ also allows the battery to have a high reversible capacity.

In some preferred embodiments, the positive electrode active material comprises one or more of first lithium-manganese-based positive electrode active material and second lithium-manganese-based positive electrode active material.

The first lithium-manganese-based positive electrode active material is a compound of chemical formula (1):

$$Li_{1+x}Mn_aNi_bM_{1-a-b}O_{2-y}A_y \qquad \text{Chemical formula (1)}$$

in the chemical formula (1), $-0.1 \leq x \leq 0.2$, $0 < a < 1$, $0 \leq b < 1$, $0 < a+b < 1$, $0 \leq y < 0.2$, and M is one or more of Co, Fe, Cr, Ti, Zn, V, Al, Zr and Ce; A comprises one or more of S, N, F, Cl, Br and I.

Further preferably, in the chemical formula (1), $0.5 \leq b < 1$.
Further preferably, in the chemical formula (1), $0.5 \leq b < 1$, M is one or both of Co and Al, and A is one or both of S and F.

The second lithium-manganese-based positive electrode active material is a compound of chemical formula (2):

$$Li_{1+z}Mn_cN_{2-c}O_{4-d}B_d \qquad \text{Chemical formula (2)}$$

in the chemical formula (2), $-0.1 \leq z \leq 0.2$, $0 < c \leq 2$, $0 \leq d < 1$, and N comprises one or more of Ni, Fe, Cr, Ti, Zn, V, Al, Mg, Zr and Ce, and B comprises one or more of S, N, F, Cl, Br and I.

In some more preferred embodiments, the positive electrode active material comprises first lithium-manganese-based positive electrode active material and second lithium-manganese-based positive electrode active material. The positive electrode active material comprising both first lithium-manganese-based positive electrode active material and second lithium-manganese-based positive electrode active material can fully exert the synergistic effect between the first lithium-manganese-based positive electrode active material and the second lithium-manganese-based positive electrode active material. This can result in a positive electrode active material having a higher gram capacity and structural stability, while reducing the oxidation of electrolyte on the surface of the positive electrode active material. This can also effectively reduce polarization in battery, thereby reducing capacity loss due to polarization. In particular, said synergistic effect can further reduce the dissolution of manganese ions from the positive electrode active material, thereby effectively reducing the loss of the positive electrode active material and improving the capacity exertion and capacity retention ratio of the battery. As a result, the cycle performance and storage performance of the battery are further improved.

Further, the weight ratio of the first lithium-manganese-based positive electrode active material to the second lithium-manganese-based positive electrode active material is preferably from 99.5:0.5 to 1:4, more preferably from 7:3 to 9:11. A suitable weight ratio of the first lithium-manganese-based positive electrode active material to the second lithium-manganese-based positive electrode active material can better exert synergistic effect between the first lithium-manganese-based positive electrode active material and the second lithium-manganese-based positive electrode active material.

In addition, the positive electrode active material layer may further comprise a conductive agent and/or a binder. In the present application, the types of the conductive agent and the binder in the positive electrode active material layer are not specifically limited, and can be selected according to actual demands. As an example, the conductive agent used for the positive electrode active material layer may be one or more of graphite, superconducting carbon, acetylene black, carbon black, ketjen black, carbon dots, carbon nanotubes, graphene, and carbon nanofibers; the binder used for the positive electrode active material layer may be one or more of butyl styrene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA) and polyvinyl alcohol (PVA).

In some optional embodiments, the mass ratio of the conductive agent to the positive electrode active material in the positive electrode active material layer is 1.5:95.5 or more, and the weight percentage of the binder in the positive electrode active material layer is 2 wt % or less. By making the content of the conductive agent and the binder in the positive electrode active material layer within a predetermined range, it is beneficial for the positive electrode active material to be fully encapsulated by the conductive agent, forming a uniform and rapid electron transport network, thereby improving rate performance and cycle performance of the lithium ion secondary battery.

The positive electrode current collector may be a metal foil or a porous metal sheet, for example, a foil or a porous sheet made of a metal such as aluminum, copper, nickel, titanium, or silver, or an alloy thereof, such as aluminum foil.

The positive electrode plate can be prepared by coating method. For example, the positive electrode active material, the binder, the conductive agent, and the organic solvent are first mixed in a predetermined ratio, wherein the organic solvent may be N-methylpyrrolidone (NMP), and the mixture is stirred to a uniform system to obtain a positive electrode slurry; then the slurry is applied onto the positive electrode current collector, and after drying, rolling, and the like, a positive electrode plate is obtained.

In the lithium ion secondary battery of embodiments of the present application, the negative electrode active material layer has a compaction density s of preferably 1.3 g/cm³ to 1.65 g/cm³. Using the negative electrode active material layer with a compaction density of 1.3 g/cm³ to 1.65 g/cm³, the diffusion rate of $Mn^{2+}$ in the negative electrode active material layer is low, so that the ion exchange between $Mn^{2+}$ and lithium in the negative electrode is reduced, thereby suppressing the destruction of manganese to negative electrode plate and improving the stability of negative electrode plate.

The one-sided areal density Q of the negative electrode active material layer is preferably from 70 g/m² to 140 g/m². A suitable single-sided areal density Q of the negative electrode active material layer can ensure the negative electrode active material layer having more lithium intercalation sites and higher gram capacity, and at the same time, is beneficial for the electrolyte containing an appropriate amount of vinylene carbonate to ensure lower viscosity of the electrolyte and improve the wetting performance of the electrolyte in the battery. In addition, the one-sided areal density Q of the negative electrode active material layer is also suitable for making the negative electrode active material layer have a short migration path of lithium ions and electrons. The resulting lithium ion secondary battery has a small polarization phenomenon and can have higher rate performance and cycle performance.

The one-sided areal density Q of the negative electrode active material layer can be calculated according to the equation $Q=m_a/s_a$, wherein $m_a$ is the mass of the negative electrode active material layer; $s_a$, wherein $m_a$ is the area of the negative electrode active material layer.

The compaction density of the negative electrode active material layer can be calculated according to the equation $s=Q/d_a$, wherein $d_a$ is the thickness of the negative electrode active material layer.

The type of the negative electrode active material is not specifically limited in the present application, and can be selected according to actual demands. As an example, the negative electrode active material may be one or more of natural graphite, artificial graphite, mesophase micro carbon sphere (MCMB), hard carbon, soft carbon, silicon, silicon-carbon composite, SiO, Li—Sn alloy, Li—Sn—O alloy, Sn, SnO, $SnO_2$, lithium titanate $Li_4Ti_5O_{12}$ with spinel structure, Li—Al alloy and metallic lithium.

The negative electrode active material layer may further comprise a conductive agent and/or a binder. In the present application, the types of the conductive agent and the binder in the negative electrode active material layer are not specifically limited, and can be selected according to actual demands. As an example, the conductive agent used for the negative electrode active material layer may be one or more of graphite, superconducting carbon, acetylene black, carbon black, ketjen black, carbon dots, carbon nanotubes, graphene, and carbon nanofibers; the binder used for the negative electrode active material layer may be one or more of butyl styrene rubber (SBR), polyvinylidene fluoride (PVDF), polytetrafluoroethylene (PTFE), polyvinyl butyral (PVB), water-based acrylic resin, and carboxymethyl cellulose (CMC).

The negative electrode active material layer may optionally further comprise a thickener such as carboxymethyl cellulose (CMC).

The negative electrode current collector may be a metal foil or a porous metal sheet, for example, a foil or a porous sheet made of a metal such as copper, nickel, titanium, or iron, or an alloy thereof, such as copper foil.

The negative electrode plate can be prepared according to a conventional method in the art. Usually, the negative electrode active material and optional conductive agent, binder and thickener are dispersed in a solvent to form a uniform negative electrode slurry, and the solvent may be N-methylpyrrolidone (NMP) or deionized water. Then the negative electrode slurry is applied on the negative electrode current collector, and after drying, cold pressing and the like, a negative electrode plate is obtained.

In the lithium ion secondary battery of embodiments of the present application, the weight percentage r of vinylene carbonate present in the electrolyte is preferably from 0.01 wt % to 3.5 wt %. A suitable weight percentage r of vinylene carbonate present in the electrolyte can effectively reduce the ion exchange between $Mn^{2+}$ and lithium in the negative electrode and improve the stability of the negative electrode while obtaining high exertion of the capacity of the battery. In addition, the weight percentage r of vinylene carbonate present in the electrolyte within the above range can also result in a relatively small thickness of interface film of the negative electrode, to ensure a relatively low interfacial resistance of the negative electrode, thereby obtaining a battery with relatively high kinetic performance and cycle performance.

The solvent in the electrolyte may be a non-aqueous organic solvent, such as one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB), and ethyl butyrate (EB), preferably two or more of them.

In some preferred embodiments, one or more, preferably two or more, of ethylene carbonate (EC), propylene carbonate (PC), and diethyl carbonate (DEC) are used as the solvent in the electrolyte.

In other preferred embodiments, the solvent of the electrolyte comprises first solvent and second solvent. The first solvent is selected from one or more of ethylene carbonate (EC), propylene carbonate (PC), and diethyl carbonate (DEC); the second solvent is selected from one or more of dimethyl carbonate (DMC), ethyl methyl carbonate (EMC), methyl formate (MF), methyl acetate (MA), ethyl acetate (EA), propyl acetate (PA), methyl propionate (MP), ethyl propionate (EP), propyl propionate (PP), and methyl butyrate (MB).

Further preferably, the weight ratio of the second solvent to the first solvent in the electrolyte is from 0 to 4. By using an electrolyte with the weight ratio of the second solvent to the first solvent of from 0 to 4, the lithium salt can be sufficiently dissociated, and the electrolyte itself has high stability at high temperature. Furthermore, the weight ratio of the second solvent to the first solvent in the electrolyte is greater than 0 and less than or equals to 4. This is beneficial for reducing the surface tension of the electrolyte and improving the ionic conductivity.

In the electrolyte, the lithium salt can be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium triflate), LiDFOB (lithium difluorooxalate borate), LiBOB (lithium bisoxalate borate), $LiPO_2F_2$ (lithium difluorophosphate), LiDFOP (lithium difluorooxalatophosphate) and LiTFOP (lithium tetrafluorooxalatophosphate), preferably selected from one or more of $LiPF_6$ (lithium hexafluorophosphate), $LiBF_4$ (lithium tetrafluoroborate), LiBOB (lithium bisoxalateborate), LiDFOB (lithium difluorooxalate borate), LiTFSI (lithium bistrifluoromethanesulfonimide), and LiFSI (lithium bisfluorosulfonimide).

The electrolyte may also optionally comprise other additives, such as one or more of fluoroethylene carbonate (FEC), ethylene sulfate (DTD), succinonitrile (SN), adiponitrile (ADN), sulfonate cyclic quaternary ammonium salt, tri(trimethylsilyl) phosphate (TMSP) and tris(trimethylsilyl) borate (TMSB).

The above electrolyte may be prepared in accordance with a conventional method in the art. An electrolyte may be obtained by uniformly mixing a solvent and a lithium salt and an additive. Here, the sequence in which the materials are added is not particularly limited. For example, an electrolyte may be obtained by adding a lithium salt and additive into a solvent and uniformly mixing. Here, the lithium salt may be first added into the solvent, and then the additive may be added into the solvent.

The separator in the lithium ion secondary battery of embodiments of the present application is not particularly limited, and any well-known separator having a porous structure and having electrochemical stability and chemical stability can be used. For example, the separator is selected from a monolayer film or multilayer film of one or more of glass fiber, nonwoven fabric, polyethylene (PE), polypropylene (PP), and polyvinylidene fluoride (PVDF).

Some exemplary embodiments of the present invention are provided as follows.

Embodiment 1. A lithium ion secondary battery comprising a battery core and an electrolyte, wherein:
the battery core comprises a lithium-manganese-based positive electrode active material;
the electrolyte comprises a solvent, a lithium salt and an additive, and the additive comprises vinylene carbonate; and
wherein the weight percentage q of the electrolyte based on the total weight of positive electrode active material layer in the battery core, the weight percentage r of vinylene carbonate present in the electrolyte, the compaction density s of negative electrode active material layer in the battery core and the weight percentage p of manganese element present in the positive electrode active material satisfies the formula (1):

$$0.05 \leq \frac{q \cdot r \cdot s}{p} \leq 6 \qquad \text{Formula (1)}$$

in the formula (1), the units of q, r, and p are wt %, and the unit of s is $g/cm^3$.

Embodiment 2. The lithium ion secondary battery according to Embodiment 1, wherein the weight percentage q of the electrolyte based on the total weight of the positive electrode active material layer in the battery core, the weight percentage r of vinylene carbonate present in the electrolyte, the compaction density s of the negative electrode active material layer in the battery core and the weight percentage p of manganese element present in the positive electrode active material satisfies the formula (2):

$$0.25 \leq \frac{q \cdot r \cdot s}{p} \leq 5 \qquad \text{Formula (2)}$$

in the formula (2), the units of q, r, and p are wt %, and the unit of s is $g/cm^3$.

Embodiment 3. The lithium ion secondary battery according to any one of Embodiments 1 to 2, wherein in the lithium ion secondary battery, the ratio of the number of vinylene carbonate molecules to the number of manganese atoms is from 0.1:100 to 1.3:100.

Embodiment 4. The lithium ion secondary battery according to any one of Embodiments 1 to 3, wherein the weight percentage q of the electrolyte based on the total weight of the positive electrode active material layer in the battery core is from 20 wt % to 70 wt %.

Embodiment 5. The lithium ion secondary battery according to any one of Embodiments 1 to 4, wherein the weight percentage r of vinylene carbonate present in the electrolyte is from 0.01 wt % to 3.5 wt %.

Embodiment 6. The lithium ion secondary battery according to any one of Embodiments 1 to 5, wherein:
the negative electrode active material layer in the battery core has a compaction density s of 1.3 g/cm$^3$ to 1.65 g/cm$^3$; and/or,
the positive electrode active material layer has a compaction density of from 3.0 g/cm$^3$ to 3.6 g/cm$^3$.

Embodiment 7. The lithium ion secondary battery according to any one of Embodiments 1 to 6, wherein the weight percentage p of manganese element present in the positive electrode active material is from 5 wt % to 50 wt %, preferably from 6 wt % to 35 wt %.

Embodiment 8. The lithium ion secondary battery according to any one of Embodiments 1 to 7, wherein the one-sided areal density Q of the negative electrode active material layer is from 70 g/m$^2$ to 140 g/m$^2$.

Embodiment 9. The lithium ion secondary battery according to any one of Embodiments 1 to 8, wherein the lithium-manganese-based positive electrode active material comprises one or more of first lithium-manganese-based positive electrode active material represented by chemical formula (1) and second lithium-manganese-based positive electrode active material represented by chemical formula (2),

$$Li_{1+x}Mn_aNi_bM_{1-a-b}O_{2-y}A_y \quad \text{Chemical formula (1)}$$

in the chemical formula (1), $-0.1 \le x \le 0.2$, $0<a<1$, $0 \le b<1$, $0<a+b<1$, $0 \le y<0.2$, and M is one or more of Co, Fe, Cr, Ti, Zn, V, Al, Zr and Ce; A comprises one or more of S, N, F, Cl, Br and I;

$$Li_{1+z}Mn_cN_{2-c}O_{4-d}B_d \quad \text{Chemical formula (2)}$$

in the chemical formula (2), $-0.1 \le z \le 0.2$, $0<c \le 2$, $0 \le d<1$, and N comprises one or more of Ni, Fe, Cr, Ti, Zn, V, Al, Mg, Zr and Ce, and B comprises one or more of S, N, F, Cl, Br and I.

Embodiment 10. The lithium ion secondary battery according to any one of Embodiments 1 to 9, wherein:
the weight ratio of the second solvent to the first solvent in the electrolyte is from 0 to 4; and wherein the first solvent is selected from one or more of ethylene carbonate, propylene carbonate, and diethyl carbonate, and the second solvent is selected from one or more of dimethyl carbonate, ethyl methyl carbonate, methyl formate, methyl acetate, ethyl acetate, propyl acetate, methyl propionate, ethyl propionate, propyl propionate, and methyl butyrate; and/or,
the lithium salt is selected from one or more of lithium hexafluorophosphate, lithium tetrafluoroborate, lithium bisoxalate borate, lithium difluorooxalate borate, lithium bistrifluoromethanesulfonimide, and lithium bisfluorosulfonimide.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment, and the instruments used in the examples are commercially available.

Example 1

Preparation of Positive Electrode Plate

A first lithium-manganese-based positive electrode active material $LiNi_{0.8}Co_{0.1}Mn_{0.1}O_2$, a second lithium-manganese-based positive electrode active material $LiMn_2O_4$, a conductive carbon black and a binder PVDF were dispersed in a solvent NMP and uniformly mixed to obtain a positive electrode slurry; then the positive electrode slurry was uniformly coated on a positive electrode current collector aluminum foil; and after drying, cold pressing, slitting and cutting, a positive electrode plate was obtained, wherein the weight ratio η of the first lithium-manganese-based positive electrode active material $LiNi_{0.8}Co_{0.1}Mn_{0.1}O_2$ to the second lithium-manganese-based positive electrode active material $LiMn_2O_4$ was 46:54 and the weight ratio of the positive electrode active material, the conductive carbon black and the binder PVDF was 96:2:2.

Preparation of Negative Electrode Plate

A negative electrode active material graphite and a conductive carbon black, a thickener CMC and a binder SBR were dispersed in a solvent deionized water at a weight ratio of 96:1:1:2 and uniformly mixed to obtain a negative electrode slurry; then the negative electrode slurry was uniformly coated on a negative current collector copper foil; and after drying, cold pressing, slitting, and cutting, a negative electrode plate was obtained.

Preparation of Electrolyte

Ethylene carbonate (EC) and diethyl carbonate (DEC) as the first solvent were uniformly mixed with ethyl methyl carbonate (EMC) as the second solvent at a weight ratio of 17:5:78 to obtain a non-aqueous organic solvent with the weight ratio of the second solvent to the first solvent of about 3.5. Then, 1 mol/L of $LiPF_6$ and 0.42 wt % of vinylene carbonate based on the weight of the electrolyte was dissolved in the above non-aqueous organic solvent, and uniformly mixed to obtain an electrolyte.

Preparation of Lithium Ion Secondary Battery

The positive electrode plate, a separator and the negative electrode plate were stacked in order. A PP/PE/PP composite film was used as the separator for taking an isolating action between the positive electrode plate and the negative electrode plate. Then the stack was wound into a battery core and packed in a soft casing. A soft pack battery was made after top side sealing and electrolyte injection.

Examples 2-12 and Comparative Examples 1-2

Different from Example 1, the parameters relating to the steps of preparation of the positive electrode plate, the negative electrode plate and the electrolyte were adjusted, as shown in Table 1.

Test Section (1) Thermal Shock Test of Lithium Ion Secondary Battery

Fresh lithium ion secondary battery was allowed to stand at 25° C. for 5 minutes, and charged at a constant current of 1 C to a voltage of 4.2 V, and then charged at a constant voltage until the current was 0.05 C or less, and then was allowed to stand for 5 minutes. Then, the lithium ion secondary battery was placed in an oven, and the oven temperature was set to be raised from 25° C. to 130° C. at a heating rate of 2° C./min, and kept for 2 hours. The temperature of the battery surface and the battery status during the heating process and the heat preservation process were monitored and recorded.

(2) High-Temperature Cycle Performance Test of Lithium Ion Secondary Battery

The lithium ion secondary battery was allowed to stand for 5 minutes at 45° C., and charged at a constant current of 1 C to a voltage of 4.2 V, and then charged at a constant voltage until the current was 0.05 C or less, and then allowed to stand for 5 minutes, and discharged at a constant current of 1 C to 3.0 V. This was a charge/discharge cycle. The discharge capacity at this time was the discharge capacity at the first cycle of the lithium ion secondary battery. The lithium ion secondary battery was subjected to 500 charge/discharge cycles in accordance with the above method. Discharge capacity in each cycle was recorded.

The capacity retention ratio (%) of the lithium ion secondary battery after 500 1 C/1 C cycles at 45° C.=discharge capacity at the $500^{th}$ cycle/discharge capacity at the first cycle×100%.

(3) High-Temperature Storage Performance Test of Lithium Ion Secondary Battery

At 25° C., fresh lithium ion secondary battery was allowed to stand for 5 minutes, and charged at a constant current of 1 C to a voltage of 4.2 V, and then charged at a constant voltage until the current was 0.05 C or less, and then was allowed to stand for 5 minutes. Then, the battery was discharged at a constant current of 1 C to a voltage of 3.0 V. The initial discharge capacity of the lithium ion secondary battery was tested.

At 25° C., fresh lithium ion secondary battery was allowed to stand for 5 minutes, and charged at a constant current of 1 C to a voltage of 4.2 V, and then charged at a constant voltage until the current was 0.05 C or less, and then was allowed to stand for 5 minutes. Then, the fully charged lithium ion secondary battery was placed in an oven at 60° C. for 60 days.

After storage at high temperature for 60 days, the lithium ion secondary battery was naturally cooled down to 25° C. Then, the battery was discharged at a constant current of 1 C to a voltage of 3.0 V, and charged at a constant current of 1 C to a voltage of 4.2 V, then charged again at a constant voltage until the current was 0.05 C or less, and then was allowed to stand for 5 minutes, and discharged at a constant current of 1 C to a voltage of 3.0 V. Then, the discharge capacity of the lithium ion secondary battery after storage at high temperature for 60 days was tested.

The capacity retention ratio (%) of the lithium ion secondary battery after storage at high temperature for 60 days=discharge capacity after storage at high temperature for 60 days/initial discharge capacity×100%.

The test results of Examples 1-16 and Comparative Examples 1-2 were shown in Table 2.

TABLE 1

| | | Positive electrode plate | | | Negative electrode plate | | | | |
| --- | --- | --- | --- | --- | --- | --- | --- | --- | --- |
| | I/II | Weight ratio η | p wt % | Compaction density g · cm$^{-3}$ | Compaction density g · cm$^{-3}$ | one-sided areal density Q, g · cm$^{-2}$ | r wt % | q wt % | $\frac{q \cdot r \cdot s}{p}$ |
| Example 1 | LiNi$_{0.8}$Co$_{0.1}$Mn$_{0.1}$O$_2$/LiMn$_2$O$_4$ | 46:54 | 35 | 3.2 | 1.44 | 100 | 0.42 | 50 | 0.85 |
| Example 2 | LiNi$_{0.8}$Co$_{0.1}$Mn$_{0.1}$O$_2$/LiMn$_2$O$_4$ | 25:75 | 47 | 3.1 | 1.35 | 100 | 0.04 | 40 | 0.05 |
| Example 3 | LiNi$_{0.8}$Co$_{0.1}$Mn$_{0.1}$O$_2$/LiMn$_2$O$_4$ | 55:45 | 30 | 3.2 | 1.60 | 100 | 2.20 | 51 | 5.98 |
| Example 4 | LiNi$_{0.8}$Co$_{0.1}$Mn$_{0.1}$O$_2$/LiMn$_2$O$_4$ | 90:10 | 11 | 3.3 | 1.37 | 100 | 0.83 | 50 | 5.17 |
| Example 5 | LiNi$_{0.8}$Co$_{0.1}$Mn$_{0.1}$O$_2$/LiMn$_2$O$_4$ | 98:2 | 6.7 | 3.2 | 1.42 | 100 | 0.70 | 35 | 5.19 |
| Example 6 | LiNi$_{0.8}$Co$_{0.1}$Mn$_{0.1}$O$_2$/LiMn$_2$O$_4$ | 55:45 | 30 | 3.2 | 1.32 | 90 | 1.10 | 37 | 1.79 |
| Example 7 | LiNi$_{0.8}$Co$_{0.1}$Mn$_{0.1}$O$_2$/LiMn$_2$O$_4$ | 46:54 | 35 | 3.5 | 1.40 | 100 | 1.60 | 40 | 2.56 |
| Example 8 | LiNi$_{0.8}$Co$_{0.1}$Mn$_{0.1}$O$_2$/LiMn$_2$O$_4$ | 46:54 | 35 | 3.4 | 1.37 | 120 | 2.50 | 35 | 3.43 |
| Example 9 | LiNi$_{0.8}$Co$_{0.1}$Mn$_{0.1}$O$_2$/LiMn$_2$O$_4$ | 99.5:0.5 | 5.9 | 3.6 | 1.65 | 70 | 0.01 | 36 | 0.10 |
| Example 10 | LiNi$_{0.8}$Co$_{0.1}$Mn$_{0.1}$O$_2$/LiMn$_2$O$_4$ | 46:54 | 35 | 3.1 | 1.35 | 100 | 0.20 | 33 | 0.25 |
| Example 11 | LiNi$_{0.8}$Co$_{0.1}$Mn$_{0.1}$O$_2$/LiMn$_2$O$_4$ | 70:30 | 22 | 3.6 | 1.65 | 70 | 0.33 | 20 | 0.50 |
| Example 12 | LiNi$_{0.8}$Co$_{0.1}$Mn$_{0.1}$O$_2$/LiMn$_2$O$_4$ | 60:40 | 27.7 | 3.0 | 1.53 | 140 | 2.00 | 45 | 4.97 |
| Example 13 | LiNi$_{0.8}$Co$_{0.1}$Mn$_{0.1}$O$_2$/LiMn$_2$O$_4$ | 20:80 | 49.8 | 3.6 | 1.50 | 100 | 3.50 | 50 | 5.27 |
| Example 14 | LiNi$_{0.6}$Co$_{0.2}$Mn$_{0.2}$O$_2$/LiMn$_2$O$_4$ | 62:38 | 30 | 3.3 | 1.32 | 100 | 1.44 | 70 | 4.43 |
| Example 15 | LiNi$_{0.5}$Co$_{0.2}$Mn$_{0.3}$O$_2$/LiMn$_2$O$_4$ | 71:29 | 30 | 3.2 | 1.49 | 100 | 0.80 | 50 | 1.99 |
| Example 16 | LiNi$_{1/3}$Co$_{1/3}$Mn$_{1/3}$O$_2$/LiMn$_2$O$_4$ | 74:26 | 30 | 3.1 | 1.50 | 100 | 0.80 | 50 | 2.00 |
| Comparative Example 1 | LiNi$_{0.8}$Co$_{0.1}$Mn$_{0.1}$O$_2$/LiMn$_2$O$_4$ | 55:45 | 30 | 3.2 | 1.30 | 100 | 0.03 | 25 | 0.03 |
| Comparative Example 2 | LiNi$_{0.8}$Co$_{0.1}$Mn$_{0.1}$O$_2$/LiMn$_2$O$_4$ | 55:45 | 30 | 3.2 | 1.46 | 100 | 2.00 | 70 | 6.81 |

In Table 1, I represents the first lithium-manganese-based positive electrode active material; II represents the second lithium-manganese-based positive electrode active material;

Weight ratio η is the weight ratio of the first lithium-manganese-based positive electrode active material to the second lithium-manganese-based positive electrode active material;

p represents the weight percentage of manganese element present in the positive electrode active material;

r represents the weight percentage of vinylene carbonate VC present in the electrolyte;

q represents the weight percentage of the electrolyte based on the total weight of the positive electrode active material layer in the battery core.

TABLE 2

|  | Thermal shock test | | Capacity retention ratio (%) after 500 1C/1C cycles at 45° C. | Capacity retention ratio (%) after storage at 60° C. for 60 days |
|---|---|---|---|---|
|  | Maximum surface temperature of battery/° C. | Battery status during the thermal shock test | | |
| Example 1 | 138.6 | no naked fire, no smoke | 88.5 | 94.8 |
| Example 2 | 138.3 | no naked fire, no smoke | 78.6 | 85.1 |
| Example 3 | 138.3 | no naked fire, no smoke | 79.3 | 84.2 |
| Example 4 | 141.3 | no naked fire, no smoke | 83.2 | 86.5 |
| Example 5 | 148.7 | no naked fire, no smoke | 83.8 | 87.3 |
| Example 6 | 138.9 | no naked fire, no smoke | 87.9 | 94.0 |
| Example 7 | 138.7 | no naked fire, no smoke | 87.2 | 93.4 |
| Example 8 | 138.8 | no naked fire, no smoke | 86.5 | 92.1 |
| Example 9 | 158.1 | no naked fire, no smoke | 80.9 | 87.5 |
| Example 10 | 138.1 | no naked fire, no smoke | 84.7 | 90.9 |
| Example 11 | 139.5 | no naked fire, no smoke | 86.9 | 92.3 |
| Example 12 | 138.6 | no naked fire, no smoke | 86.2 | 92.6 |
| Example 13 | 137.7 | no naked fire, no smoke | 81.3 | 85.7 |
| Example 14 | 132.0 | no naked fire, no smoke | 88.3 | 95.3 |
| Example 15 | 129.8 | no naked fire, no smoke | 89.2 | 95.2 |
| Example 16 | 127.5 | no naked fire, no smoke | 89.7 | 94.5 |
| Comparative Example 1 | 138.1 | no naked fire, no smoke | 69.8 | 75.9 |
| Comparative Example 2 | 138.5 | no naked fire, no smoke | 69.5 | 74.4 |

Analysis on comparison of Examples 1 to 13 and Comparative Examples 1 to 2 shows that when the battery core and the electrolyte in lithium ion secondary battery satisfy 0.05≤q·r·s/p≤6, the lithium ion secondary battery has a significantly increased capacity retention ratio after 400 1 C/1 C cycles at 45° C. and a significantly increased capacity retention ratio after storage at 60° C. for 60 days. Thus, by using the battery core and the electrolyte in lithium ion secondary battery satisfying 0.05≤q·r·s/p≤6, storage performance and cycle performance of the lithium ion secondary battery can be significantly increased while maintaining relatively high safety performance.

With reference to Examples 1 to 16, it can be seen that the lithium ion secondary battery of embodiments of the present application can simultaneously has relatively high safety performance and storage performance and cycle performance, and the battery can also have relatively high safety performance and storage performance and cycle performance at high temperature.

The above mentioned descriptions only show particular implementations of the present application and but are not intended to limit the protection scope of the present application. Any modification or replacement readily figured out by a person skilled in the art within the technical scope disclosed in the present invention shall fall within the protection scope of the present application. Therefore, the protection scope of the present invention shall be subject to the protection scope of the claims.

What is claimed is:

1. A lithium ion secondary battery comprising a battery core and an electrolyte, wherein:

the battery core comprises a negative electrode active material and a lithium-manganese-based positive electrode active material;

wherein the lithium-manganese-based positive electrode active material comprises first lithium-manganese-based positive electrode active material represented by chemical formula (1) and second lithium-manganese-based positive electrode active material represented by chemical formula (2), $Li_{1+x}Mn_aNi_bM_{1-a-b}O_{2-y}A_y$     Chemical formula (1)

in the chemical formula (1), −0.1≤x≤0.2, 0<a<1, 0≤b<1, 0<a+b<1, 0≤y<0.2, and M is one or more of Co, Fe, Cr, Ti, Zn, V, Al, Zr and Ce; A comprises one or more of S, N, F, Cl, Br and I;

$Li_{1+z}Mn_cN_{2-c}O_{4-d}B_d$     Chemical formula (2)

in the chemical formula (2), −0.1≤z≤0.2, 0<c≤2, 0≤d<1, and N comprises one or more of Ni, Fe, Cr, Ti, Zn, V, Al, Mg, Zr and Ce, and B comprises one or more of S, N, F, Cl, Br and I;

the electrolyte comprises a solvent, a lithium salt and an additive, and the additive comprises vinylene carbonate; and wherein weight percentage q of the electrolyte based on a total weight of the positive electrode active material layer in the battery core is from 50 wt % to 70 wt %, weight percentage r of vinylene carbonate present in the electrolyte is from 0.01 wt % to 3.5 wt %, compaction density s of negative electrode active material layer in the battery core is from 1.3 g/cm³ to 1.65 g/cm³, and weight percentage p of manganese element present in the positive electrode active material is from 5 wt % to 50 wt %, and q, r, s, p satisfy formula (1):

$$0.05 \leq \frac{q \cdot r \cdot s}{p} \leq 6 \qquad \text{Formula (1)}$$

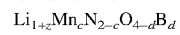

in the formula (1), the units of q, r, and p are wt %, and the unit of s is g/cm³.

2. The lithium ion secondary battery according to claim 1, wherein the weight percentage q of the electrolyte based on the total weight of the positive electrode active material layer in the battery core, the weight percentage r of vinylene carbonate present in the electrolyte, the compaction density s of the negative electrode active material layer in the battery core and the weight percentage p of manganese element present in the positive electrode active material satisfies the formula (2):

$$0.25 \leq \frac{q \cdot r \cdot s}{p} \leq 5 \qquad \text{Formula (2)}$$

in the formula (2), the units of q, r, and p are wt %, and the unit of s is g/cm³.

3. The lithium ion secondary battery according to claim 1, wherein in the lithium ion secondary battery, ratio of number of vinylene carbonate molecules to number of manganese atoms is from 0.1:100 to 1.3:100.

4. The lithium ion secondary battery according to claim 1, wherein the weight percentage r of vinylene carbonate present in the electrolyte is from 0.01 wt % to 1.6 wt %.

5. The lithium ion secondary battery according to claim 1, wherein:
the negative electrode active material layer in the battery core has a compaction density s of 1.5 g/cm³ to 1.65 g/cm³; and,
the positive electrode active material layer has a compaction density of from 3.4 g/cm³ to 3.6 g/cm³.

6. The lithium ion secondary battery according to claim 1, wherein the weight percentage p of manganese element present in the positive electrode active material is from 35 wt % to 50 wt %.

7. The lithium ion secondary battery according to claim 1, wherein one-sided areal density Q of the negative electrode active material layer is from 90 g/m² to 140 g/m².

8. The lithium ion secondary battery according to claim 7, wherein the one-sided areal density Q of the negative electrode active material layer is from 100 g/m² to 140 g/m².

9. The lithium ion secondary battery according to claim 1, wherein in the chemical formula (1), 0.8≤b<1.

10. The lithium ion secondary battery according to claim 1, wherein:
weight ratio of second solvent to first solvent in the electrolyte is from 0 to 4; and wherein the first solvent is selected from one or more of ethylene carbonate, propylene carbonate, and diethyl carbonate, and the second solvent is selected from one or more of dimethyl carbonate, ethyl methyl carbonate, methyl formate, methyl acetate, ethyl acetate, propyl acetate, methyl propionate, ethyl propionate, propyl propionate, and methyl butyrate; and/or,
the lithium salt is selected from one or more of lithium hexafluorophosphate, lithium tetrafluoroborate, lithium difluorooxalate borate, lithium bistrifluoromethanesulfonimide, and lithium bisfluorosulfonimide.

11. A lithium ion secondary battery comprising a battery core and an electrolyte, wherein:
the battery core comprises a negative electrode active material and a positive electrode active material;
wherein the positive electrode active material comprises a first material represented by chemical formula (1) and a second material represented by chemical formula (2),

  chemical formula (1)

  chemical formula (2)

wherein, in the chemical formula (1), −0.1≤x≤0.2, 0<a<1, 0.6≤b<1, 0<a+b<1, 0≤y<0.2, in the chemical formula (2), −0.1≤z≤0.2,
wherein the electrolyte comprises vinylene carbonate,
wherein weight percentage q of the electrolyte based on a total weight of the positive electrode active material layer in the battery core is from 50 wt % to 70 wt %, weight percentage r of vinylene carbonate present in the electrolyte is from 0.01 wt % to 3.5 wt %, compaction density s of negative electrode active material layer in the battery core is from 1.3 g/cm³ to 1.65 g/cm³ and weight percentage p of manganese element present in the positive electrode active material is from 5 wt % to 50 wt %, and q, r, s, p satisfy formula (1):

$$0.05 \leq \frac{q \cdot r \cdot s}{p} \leq 6 \qquad \text{Formula (1)}$$

in the formula (1), the units of q, r, and p are wt %, and the unit of s is g/cm³.

12. The lithium ion secondary battery according to claim 11, wherein the weight percentage r of vinylene carbonate present in the electrolyte is from 0.01 wt % to 1.60 wt %.

13. The lithium ion secondary battery according to claim 12, wherein the weight percentage r of vinylene carbonate present in the electrolyte is from 0.01 wt % to 1.10 wt %.

14. The lithium ion secondary battery according to claim 11, wherein the weight percentage p of manganese element present in the positive electrode active material is from 35 wt % to 50 wt %.

15. The lithium ion secondary battery according to claim 11, wherein the positive electrode active material layer has a compaction density of from 3.4 g/cm³ to 3.6 g/cm³.

16. The lithium ion secondary battery according to claim 15, wherein the compaction density s of the negative electrode active material layer is 1.4 g/cm³ to 1.65 g/cm³.

17. The lithium ion secondary battery according to claim 11, wherein in the lithium ion secondary battery, ratio of number of vinylene carbonate molecules to number of manganese atoms is from 0.1:100 to 1.3:100.

18. The lithium ion secondary battery according to claim 11, wherein in the chemical formula (1), 0.8≤b<1.

19. The lithium ion secondary battery according to claim 11, wherein the one-sided areal density Q of the negative electrode active material layer is from 90 g/m² to 140 g/m².

* * * * *